(12) United States Patent
Michaud et al.

(10) Patent No.: US 6,498,779 B1
(45) Date of Patent: Dec. 24, 2002

(54) MULTIPLE ENDPOINT PATHS

(75) Inventors: Patricia Michaud, Ottawa (CA); Neeraj Chandra, Kanata (CA); Kirby Koster, Almonte (CA); Lay Been Tan, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/083,129

(22) Filed: May 22, 1998

(51) Int. Cl.[7] .................................................. H04J 3/14
(52) U.S. Cl. ........................ 370/227; 370/217; 370/218; 379/221.01
(58) Field of Search ................................ 370/216, 217, 370/218, 219, 220, 221, 222, 223, 224, 225, 226, 227, 228, 244, 250; 709/239; 379/221.01

(56) References Cited

U.S. PATENT DOCUMENTS

| | | | | |
|---|---|---|---|---|
| 4,884,263 A | * | 11/1989 | Suzuki | 370/228 |
| 4,999,829 A | * | 3/1991 | Fite, Jr. et al. | 370/228 |
| 5,239,537 A | * | 8/1993 | Sakauchi | 370/228 |
| 5,583,848 A | * | 12/1996 | Glitho | 370/238 |
| 5,621,722 A | * | 4/1997 | Edmaier et al. | 370/229 |
| 5,959,972 A | * | 9/1999 | Hamami | 370/228 |

FOREIGN PATENT DOCUMENTS

WO     WO-9716005    * 5/1997

* cited by examiner

Primary Examiner—Wellington Chin
Assistant Examiner—Frank Duong
(74) Attorney, Agent, or Firm—Marks & Clerk

(57) ABSTRACT

A multiple endpoint path for providing endpoint redundancy is described. Selected active end nodes in a digital communications network are configured by a network management system to have compatible alternate endpoint paths. When one of the selected active endpoint paths fails, the network management system automatically switches the endpath from the previously active endpoint to the alternate end point path.

15 Claims, 3 Drawing Sheets

MULTIPLE ENDPOINT PATHS

FIELD OF THE INVENTION

This invention relates to the management of switched digital communications through a communications network and more particularly to a method and a system for rerouting digital traffic via multiple endpoint paths in the event of an endpoint failure.

BACKGROUND OF THE INVENTION

The ever-increasing popularity of personal computers, modems and other terminal devices, in both home and enterprise environments, has expanded the need for reliable communications networks whether they be local area networks (LAN), wide area networks (WAN), Internet or Intranet. Digital networks of the type contemplated by this invention are capable of transporting circuit switched voice and data as well as packet switched communications such as frame relay and asynchronous transfer mode (ATM).

An important component in digital communications networks is the network manager which permits the user to set up and manage virtual backbone networks and virtual switched networks. Network managers such as Newbridge Networks Corporation's 4601, 4602 and 46020 MainStreet (trademark) provide the user with a graphical user interface (GUI) to create and manage network paths between selected end stations across the network architecture.

These network managers give the user or operator the capability of monitoring traffic flow from node to node within the network and to automatically reroute the traffic if a network node becomes unserviceable for any reason. In this way, if a particular switching node within the network experiences failure the network manager will automatically calculate an alternate path through the network and reroute the traffic flow as necessary in order to bypass the failed node.

It is believed that heretofore network managers have not been able to automatically overcome a situation in which the endpoint path fails. Thus, if a path is set up from endpoint to endpoint across the network and one of the pathends fail, the complete path goes out of service. In this event the status of the path is referred to as connected-down. The connections along the path remain active but the path doesn't. When the failed endpoint comes back online the complete path again becomes active. Currently, this problem is solved manually by creating another path with a new endpoint or by fixing the faulty endpoint. There is, therefore, a need to provide automatic recovery for path endpoint failures.

SUMMARY OF THE INVENTION

It is an object of the present invention to provide compatible alternate end paths for selected active end paths within a digital communication network.

Therefore, in accordance with a first aspect of the present invention there is provided, in a network manager for managing switched digital communications through a network, a system for providing endpoint path redundancy by means of multiple endpoint paths. The system comprises means to define a compatible alternate pathend for a selected active pathend; storage means for storing configuration information respecting the alternate pathend; means to detect a malfunction in the selected active pathend; means to access the storage means to obtain the configuration information in the event of a malfunction of the selected active pathend; and rerouting means to switch data destined for the selected active pathend to the alternate pathend upon receipt of the configuration information.

In accordance with a second aspect of the present invention there is provided a method of managing switched digital communications to an endpoint in a communications network, the endpoint having an active end path. The method comprises defining a compatible alternate end path for the active end path; storing configuration information respecting the alternate end path in storage means; detecting a malfunction at the active path; retrieving configuration information respecting the alternate end path in the event of a failure of the active end path; and routing the digital communication to the alternate end path on receipt of the configuration information.

BRIEF DESCRIPTION OF THE DRAWINGS

The invention will now be described in greater detail with reference to the attached drawings wherein.

DETAILED DESCRIPTION OF THE INVENTION

Figure 1:
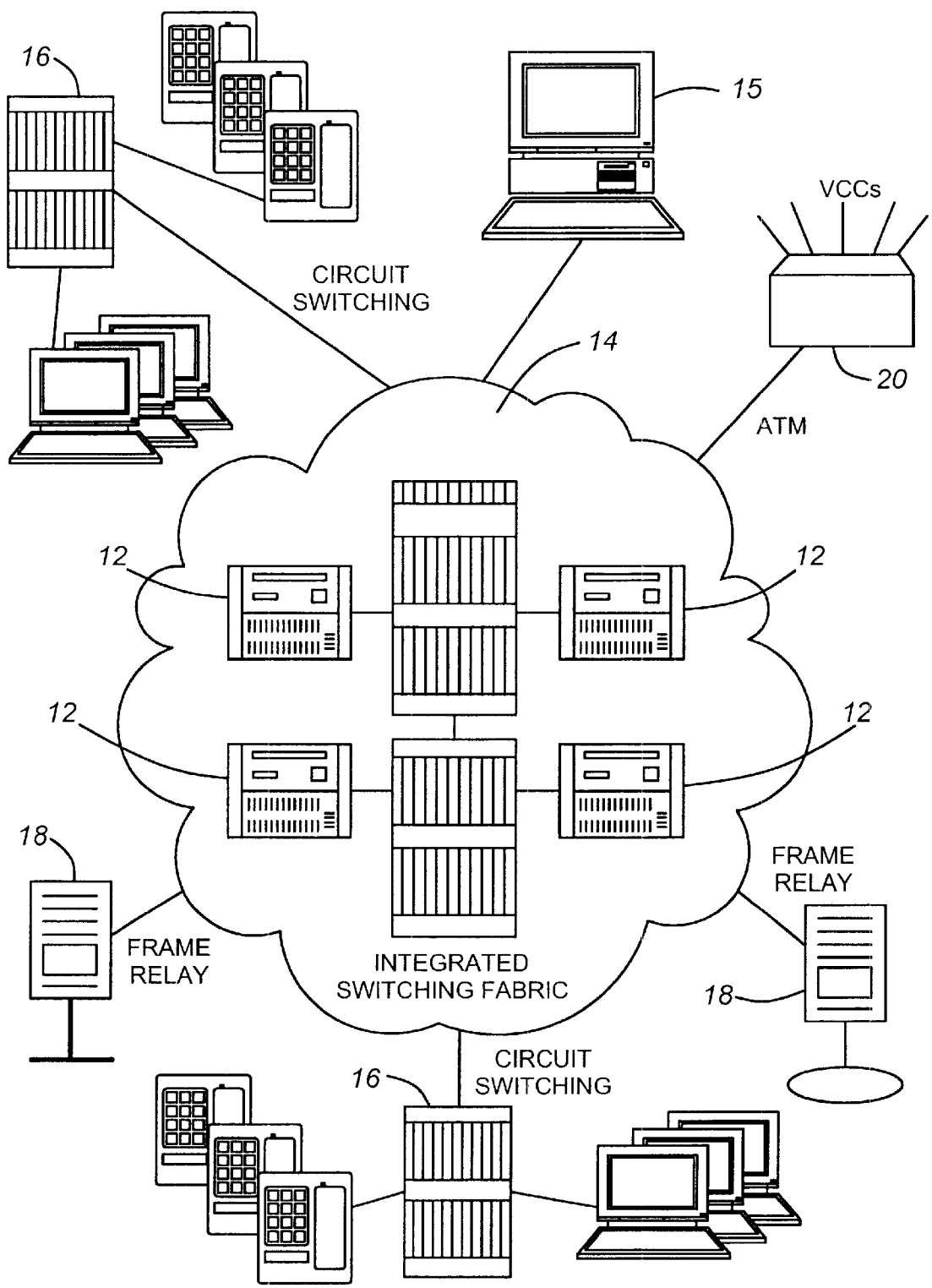
FIG. 1 is a high level illustration of an integrated network.

FIG. 1 illustrates one example of an integrated network for which the present invention is applicable. The network contains various nodes 12 within the integrated switching fabric 14 for processing and routing data traffic across the network. Network manager 15 provides overall management of data traffic flowing across the network, which traffic can contain circuit and packet switched connections. The network manager is equipped with a graphical user interface (not shown) to provide the user with a graphic view of the nodes and other equipment on the network path. Network operators use a keyboard associated with the GUI to configure and perform operations on the network equipment to configure node databases and RAM, monitor network operation in real time, set up and manage path routes and perform diagnostics and isolate and manage network problems.

As shown in FIG. 1 the integrated network includes various end nodes the specifications of which depend on the switching characteristics of the traffic directed to the specific node. These may include, for example, bandwidth managers 16 for circuit switching, bridges 18 for frame relay or routers 20 for ATM type traffic.

The following description refers specifically to circuit switching components but it is to be understood that the underlying concept of the invention applies as well to both frame relay and ATM technologies.

According to a particular embodiment of the present invention a multiple endpoint path (MEP) is provided. The MEP allows the user to define an alternate pathend for one or both of the active pathends involved in a circuit between end users. In accordance with the invention, if a failure is detected at one of the active pathends, the network manager will automatically reroute the path using the corresponding alternate pathend. If, alternatively, a failure occurs anywhere else along the path the manager will reroute the path using the pathends that are active at the time. For switched circuit data, circuit switched voice and frame relay paths multiple endpoints are configurable as alternate pathends for data termination units, primary rate circuits and direct connect card ports. As indicated previously it is within the scope of the present invention to allow all paths to be configurable as multiple endpoint paths and to allow all pathends to be valid multiple endpoint pathend types.

When a pathend of a multiple endpoint path fails, the status of the path will become connected-down if no alternate pathend has been defined. Otherwise an attempt will be made to reroute the path using the alternate pathend. This means that before the connections of the old route are disconnected a path search will be done to find a new route. The new route will then be compared to the old route to find any common connections. The common connections will be retained while all other connections from the old path will be disconnected and new connections will be made from the new path.

If both the active and alternate pathends fail or a path is not found using the alternate, the path will go into a condition known as waiting for resources. In this state, an attempt will be made to reconnect the path periodically. In each case, if the currently active endpoint fails, an attempt will be made to use the alternate.

Figure 2:
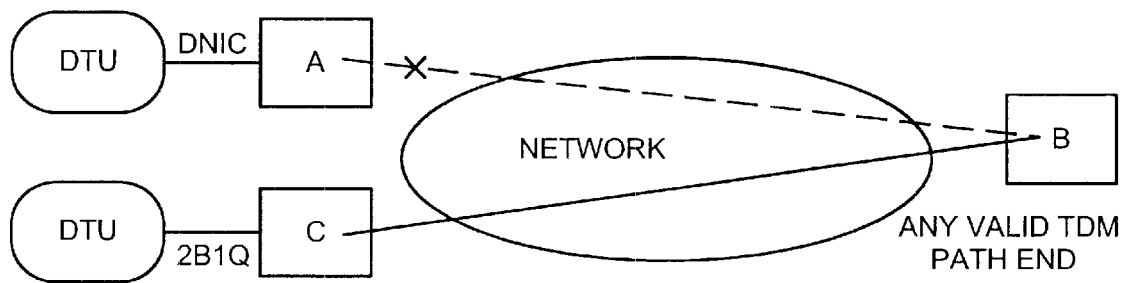
FIG. 2 illustrates a three endpoint application of multiple endpoint paths.

FIG. 2 illustrates a three endpoint application of multiple endpoint paths. In this example assume that the path is initially specified as A to B and that C is a defined alternate pathend for A. A failure of the data network interface card (DNIC), for example, at endpoint A would result in the network manager automatically rerouting the path to C-B. For the embodiment illustrated in FIG. 2 status endpoints may include in addition to a DNIC, a direct connect card (DCC), 2BIQ ports or primary rate ports on time division multiplexed (TDM) nodes (for example T1, E1, X.21 PRI, multi-port aggregate (MPA), V.35PR, etc.). The reroute would also occur if the card, etc. at the endpoint was declared faulty or had been removed. In this example wherein C is the alternate endpoint for pathend A, if the user disconnects and reconnects the path via the path configuration form, the path will always try to connect the original active endpoints, i.e. A and B first. If this path cannot be connected because one of the original pathends fails, the network manager will try to connect the path using the alternate pathend, i.e. B to C. If the failure occurs anywhere else along the path, the network manager will automatically reroute the path using the pathends that are active at the time of the network failure.

If the switch to the alternate pathend has been successful and the original active pathend becomes functional again, the path will not switch back to the original pathend automatically. The user can force a switch by selecting the forced reroute option on the path diagnostic form. If the alternate pathend is not functioning properly a warning message will appear allowing the user to proceed or back out of the switch. If a particular pathend cannot support an alternate pathend or if an alternate pathend has not been defined, the user will not be allowed to force a switch on that endpoint.

Figure 3:
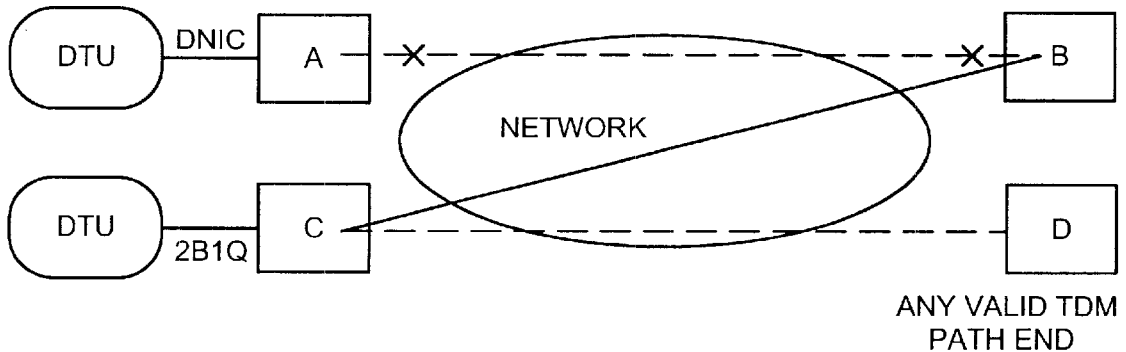
FIG. 3 is a four endpoint application of multiple endpoint paths.

FIG. 3 illustrates a four endpoint application of the embodiment shown in FIG. 2. In this example, C is defined as an alternate pathend for A, and D is defined as an alternate pathend for B. A failure of the port at A will cause the path A-B to be moved to C-B as previously described. A subsequent failure of the port at B will result in a further path realignment to C-D.

Figure 4:
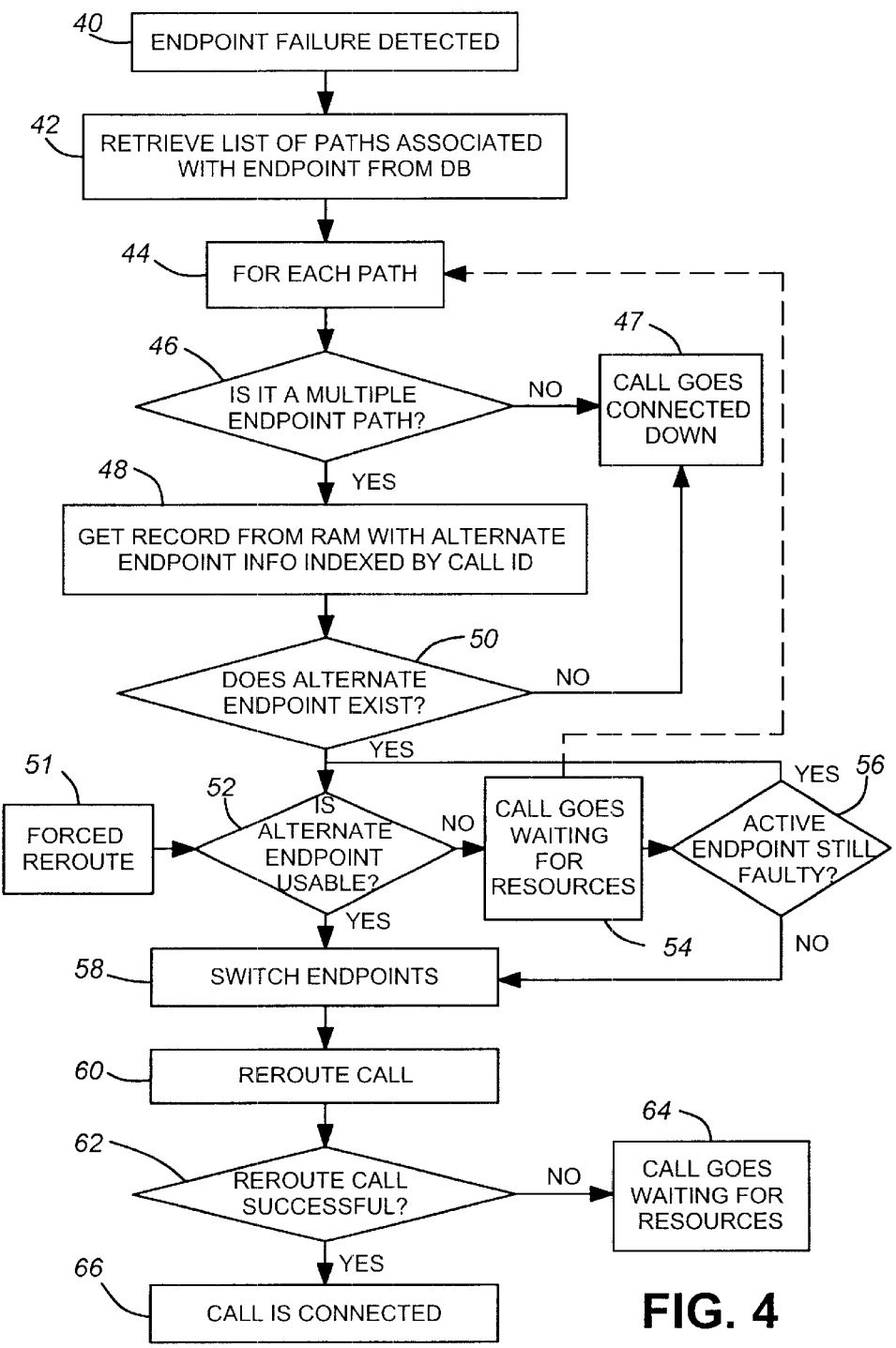
FIG. 4 illustrates a flow diagram of a call rerouting process utilizing the protocol of the present invention.

The rerouting protocol of the invention is set out in the flow diagram of FIG. 4. At step 40 the network manager 15 receives notification of an endpoint failure respecting an identified endpoint node. At step 42 the network manager 15 requests the appropriate data storage or memory means to provide a list of all calls associated with the endpoint having reported the failure. This request includes each specific call as indicated at step 44 and at step 46 the memory is again checked to determine whether the endpoint reporting failure has an alternate end path defined. If there is no alternate endpoint path the call goes to a connected down status. If the answer at step 46 is affirmative, the configuration information respecting the alternate endpoint is retrieved for confirmation from memory. If the confirmation proves negative the call again goes connected-down. If affirmative, the alternate endpoint is checked for serviceability. If the alternate endpoint is not in service again the call goes waiting for resources at step 54. If the alternate endpoint is available and has good status then the endpoints are switched such that the call is rerouted at step 60 using the network manger rerouting algorithm. If the reroute call is successful at step 62 then the call is connected at 66. If the rerouted call is not successful then the call goes waiting for resources at step 64.

The network manager may initially store configuration information in its database, but this information may subsequently be cached to RAM in individual switching nodes to increase access times. The forgoing description relates to a switched configuration wherein the network manager establishes and maintains the path through the network. The concept of the invention is also applicable to connectionless architecture wherein each node determines dynamically the next destination for the path. In this configuration alternate endpaths are defined by the access node or node which accesses each end point. The configuration information respecting an alternate endpaths is stored in RAM at the appropriate access node.

While particular embodiments of the invention have been illustrated and described it will be apparent to one skilled in the art that various changes can be made to the basic concept. It is to be understood, however, that such changes, to the extent possible, will fall within the scope of the present invention as defined by the appended claims.

What is claimed is:

1. In a digital communicatons network for carrying digital communications between distributed and points, the network having intermediate switching nodes within an integrated switching fabric, the end points being connected to the switching fabric by endpoint paths, a system for providing path redundancy for said endpoint paths by means of multiple endpoint paths, said system comprising:

means to define a compatible alternate endpoint path for a selected active endpoint path;

memory means for storing configuration information respecting said alternate endpoint paths;

means to detect a malfunction in said selected active endpoint path;

means to access said memory to obtain said configuration information upon detection of a malfunction at said selected active endpoint path; and rerouting means to switch data destined for said selected active endpoint path to said alternate endpoint path upon receipt of said configuration information.

2. A system as defined in claim 1 wherein said digital communications is connection-oriented and a network manager provisions a connection through said network.

3. A system as defined in claim 1 wherein said digital communications is connectionless-oriented.

4. A system as defined in claim 2 wherein said network manager defines said alternate endpoint path.

5. A system as defined in claim 2 wherein said end point is a data termination unit.

6. A system as defined in claim 2 wherein said digital communications is circuit switched data.

7. A system as defined in claim 2 wherein said digital communications is circuit switched voice.

8. A system as defined in claim 2 wherein said digital communications is packed switched data.

9. A system as defined in claim 2 having an alternate endpoint path for selected active endpoint paths at each end of said network.

10. A system as defined in claim 2, said network manager having means to automatically establish an alternate connection through said network in the event of a network failure.

11. In a digital communications network carrying digital communications, a system for providing path redundancy for endpoint paths by means of multiple endpoint paths, said system comprising:

means to define a compatible alternate endpoint path for a selected active endpoint path;

memory means for storing configuration information respecting said alternate endpoint paths;

means to detect a malfunctioning in said selected active endpoint path;

means to access said memory to obtain said configuration information upon detection of a malfunction at said selected active endpoint path, and rerouting means to switch data destined for said selected active endpoint path to said alternate endpoint path upon receipt of said configuration information, said digital communication being connection-oriented and a network manager provisions a connection through said network wherein said network manager has means to attempt to reestablish a connection to said active endpoint path within a set time interval in the event of a failure of both said active endpoint path and said alternate endpoint path.

12. A system as defined in claim 3 wherein an access node at said switching fabric interfaces with said endpoint path, said access node retaining configuration information respecting an alternate endpoint path.

13. A method of providing endpoint path redundancy for digital communications between distributed endpoints in a digital communications network, the network having intermediate switching nodes with an integrated switching fabric, the endpoints being connected to the switching fabric by endpoint paths, said endpoint path being an active endpoint path, said method comprising:

defining a compatible alternate endpoint path for said active endpoint path;

storing configuration information respecting said alternate endpoint path in memory;

detecting a malfunction at said active endpoint path;

retrieving configuration information respecting said alternate endpoint path from said memory on detection of a malfunction at said active endpoint path; and routing said digital communications to said alternate endpoint path on receipt of said configuration information.

14. A method as defined in claim 13 wherein said alternate endpoint path is defined by a network manager.

15. A method as defined in claim 13 wherein said digital communications is connectionless-oriented and configuration information respecting said alternate endpoint path is retained by a switching node at an access point to said active endpoint path.

* * * * *